(12) United States Patent
Hartwich

(10) Patent No.: US 9,350,617 B2
(45) Date of Patent: May 24, 2016

(54) CONTROLLER AREA NETWORK WITH FLEXIBLE DATA-RATE

(75) Inventor: Florian Hartwich, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 194 days.

(21) Appl. No.: 14/114,784

(22) PCT Filed: May 2, 2012

(86) PCT No.: PCT/EP2012/058000
§ 371 (c)(1),
(2), (4) Date: Dec. 31, 2013

(87) PCT Pub. No.: WO2012/150248
PCT Pub. Date: Nov. 8, 2012

(65) Prior Publication Data
US 2014/0071995 A1    Mar. 13, 2014

(30) Foreign Application Priority Data

May 2, 2011    (EP) ..................................... 11164445

(51) Int. Cl.
*H04L 12/24* (2006.01)
*H04L 1/00* (2006.01)
*H04L 12/40* (2006.01)
*H04J 3/22* (2006.01)

(52) U.S. Cl.
CPC .......... *H04L 41/0896* (2013.01); *H04L 1/0002* (2013.01); *H04L 12/4013* (2013.01); *H04J 3/22* (2013.01); *H04L 2001/0094* (2013.01); *H04L 2012/40215* (2013.01)

(58) Field of Classification Search
None
See application file for complete search history.

(56) References Cited

U.S. PATENT DOCUMENTS 5,574,848 A * 11/1996 Thomson ........................... 714/2
6,732,254 B1 * 5/2004 Slivkoff .................. G06F 15/78
370/412

(Continued)

FOREIGN PATENT DOCUMENTS

DE    10 2004 06221    5/2006

OTHER PUBLICATIONS

Robert Bosch GMBH ED—"CAN with Flexible Data-Rate ; White Paper, Version 1.0", Internet Citation, Apr. 30, 2011, XP002658095k Retrieved from the Internet : URL :http://ww.bosch-semiconductors.de/media/pdf/canliteratur/can_fd.pdf.

(Continued)

*Primary Examiner* — Marcus R Smith
*Assistant Examiner* — Duc Duong
(74) *Attorney, Agent, or Firm* — Norton Rose Fulbright US LLP

(57) ABSTRACT

A method for serially communicating by exchanging data frames between a transmitting and at least one receiving node connected by a bus, transmit/receive roles being assigned to nodes for each data frame by the CAN ISO 11898-1 ("CAN") arbitration procedure, exchanged data frames having a structure based on CAN, data frames being a bit sequence, the structure of the data frames including a Start-Of-Frame-Bit, and Fields for Arbitration, Control, Data, CRC, Acknowledge, and End-Of-Frame, the Data Field may have a zero-bit length, other Fields containing at least two bits, each having a bit time divided into Time Segments, the bit-rate defined by the bit time's reciprocal value, for at least one first predeterminable part of the exchanged data frames the bit-rate lies below 1 Mbit/s, for at least one second predeterminable part the bit-rate lies higher, at least two different Time Segment value sets being predeterminable for each part.

14 Claims, 4 Drawing Sheets

(56) References Cited

U.S. PATENT DOCUMENTS

| | | | |
|---|---|---|---|
| 2001/0021196 A1* | 9/2001 | Weigl et al. | 370/444 |
| 2006/0123176 A1 | 6/2006 | Fredriksson et al. | |
| 2006/0142061 A1* | 6/2006 | Steffan | 455/557 |
| 2006/0176830 A1* | 8/2006 | Yakashiro | H04L 12/4015 370/256 |
| 2010/0306457 A1* | 12/2010 | Wilson | H04L 12/40013 711/104 |
| 2012/0185721 A1* | 7/2012 | Burgt et al. | 713/400 |

OTHER PUBLICATIONS

Sheikh Imran et al : "Improving information throughput in CAN networks : Implementing the dual-speed approach", Proceedings of the Euromicro Conference on Real-Time Systems, Jun. 30, 2009, pp. 57-62.

Cena G et al : "Overclocking of controller area networks", Electronics Letters, IEE Stevenage, GB, vol. 35, No. 22, Oct. 28, 1999, pp. 1923-1925, ISSN: 0013-5194, DOL: 10.1049/EL:19991289.

* cited by examiner

| | Number of Data Bytes | Data Length Code | | | |
|---|---|---|---|---|---|
| | | DLC3 | DLC2 | DLC1 | DLC0 |
| ISO 11898-1 | 0 | 0 | 0 | 0 | 0 |
| | 1 | 0 | 0 | 0 | 1 |
| | 2 | 0 | 0 | 1 | 0 |
| | 3 | 0 | 0 | 1 | 1 |
| | 4 | 0 | 1 | 0 | 0 |
| | 5 | 0 | 1 | 0 | 1 |
| | 6 | 0 | 1 | 1 | 0 |
| | 7 | 0 | 1 | 1 | 1 |
| | 8 | 1 | 0 | 0 | 0 |
| Proposal for Additional Codes in CAN FD | 12 | 1 | 0 | 0 | 1 |
| | 16 | 1 | 0 | 1 | 0 |
| | 20 | 1 | 0 | 1 | 1 |
| | 24 | 1 | 1 | 0 | 0 |
| | 32 | 1 | 1 | 0 | 1 |
| | 48 | 1 | 1 | 1 | 0 |
| | 64 | 1 | 1 | 1 | 1 |

Figure 3

CONTROLLER AREA NETWORK WITH FLEXIBLE DATA-RATE

FIELD OF THE INVENTION

The present invention relates to a method for serially communicating by exchanging data frames between a transmitting and at least one receiving node connected by a bus system.

BACKGROUND INFORMATION

The acceptance and introduction of serial communication to more and more applications has led to requirements that the bandwidth for the serial communication needs to be increased.

Two factors limit the effective data-rate in CAN networks, first the minimum bit time required for the function of the CAN bus arbitration method and second the relation between the numbers of data bits and frame bits in a CAN message.

The following parts of the CAN protocol specification (Version 2.0, Robert Bosch GmbH, 1991) apply unchanged in the CAN FD protocol:
Definition of TRANSMITTER/RECEIVER
MESSAGE FILTERING
MESSAGE VALIDATION
CODING
ERROR HANDLING
Error Detection
Error Signaling
FAULT CONFINEMENT

SUMMARY OF THE INVENTION

A new protocol is described that is based on the CAN protocol as specified in ISO 11898-1 and is called "CAN with Flexible Data-Rate" or CAN FD. It still uses the CAN bus arbitration method, it increases the bit-rate by switching to a shorter bit time after the end of the arbitration process and returns to the longer bit time at the CRC Delimiter, before the receivers send their acknowledge bits. The effective data-rate is increased by allowing longer data fields. CAN uses four bits as Data Length Code resulting in 16 different codes, but only the first nine values are used, codes [0-8] standing for data field length of [0-8] bytes. In CAN, the codes [9-15] are defined to signify eight data bytes. In CAN FD, the codes are used to signify longer data fields.

In particular, a method is described for the serial communication by exchange of data frames between a transmitting node and at least one receiving node who are connected by a bus system is described, wherein the roles of transmitter and receiver are assigned to nodes for each data frame by the arbitration procedure defined in the CAN-Standard ISO 11898-1, wherein the exchanged data frames have a logical structure according to the CAN-Standard ISO 11898-1, wherein the data frames are composed of a sequence of bits, wherein the logical structure of the data frames includes a Start-Of-Frame-Bit, an Arbitration Field, a Control Field, a Data Field, a CRC Field, an Acknowledge Field and an End-Of-Frame Field, wherein the Data Field may have a length of zero bits, wherein each other Field contains at least two bits, wherein each bit has a bit time, wherein each bit time is divided into Time Segments (SYNC_SEG, PROP_SEG, PHASE_SEG1, PHASE_SEG2), wherein the bit-rate is defined by the reciprocal value of the bit time, wherein for at least one first predeterminable part of the exchanged data frames the bit-rate in that part lies below a maximum value of 1 Mbit/s, wherein for at least one second predeterminable part of the exchanged data frames the bit-rate in that part lies higher than in the at least one first predeterminable part, characterized in that at least two different sets of values of the Time Segments (SYNC_SEG, PROP_SEG, PHASE_SEG1, PHASE_SEG2) are predeterminable for the at least two different parts of the exchanged data frames.

BRIEF DESCRIPTION OF THE DRAWINGS

FIG. 3 shows the coding of the number of data bytes by the DATA LENGTH CODE.

DETAILED DESCRIPTION

Figure 1:
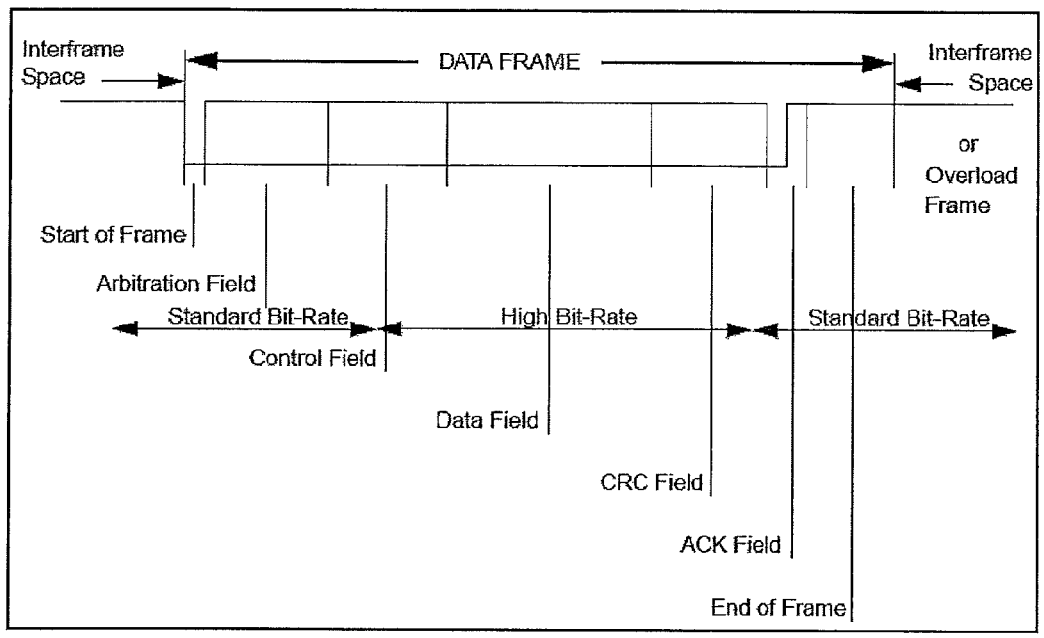
FIG. 1 shows an example of a CAN FD frame.

The following describes a method for the serial communication by exchange of data frames between a transmitting node and at least one receiving node who are connected by a bus system is described, wherein the roles of transmitter and receiver are assigned to nodes for each data frame by the arbitration procedure defined in the CAN-Standard ISO 11898-1, wherein the exchanged data frames have a logical structure according to the CAN-Standard ISO 11898-1, wherein the data frames are composed of a sequence of bits, wherein the logical structure of the data frames includes a Start-Of-Frame-Bit, an Arbitration Field, a Control Field, a Data Field, a CRC Field, an Acknowledge Field and an End-Of-Frame Field, wherein the Data Field may have a length of zero bits, wherein each other Field contains at least two bits, wherein each bit has a bit time, wherein each bit time is divided into Time Segments (SYNC_SEG, PROP_SEG, PHASE_SEG1, PHASE_SEG2), wherein the bit-rate is defined by the reciprocal value of the bit time, wherein for at least one first predeterminable part of the exchanged data frames the bit-rate in that part lies below a maximum value of 1 Mbit/s, wherein for at least one second predeterminable part of the exchanged data frames the bit-rate in that part lies higher than in the at least one first predeterminable part, characterized in that at least two different sets of values of the Time Segments (SYNC_SEG, PROP_SEG, PHASE_SEG1, PHASE_SEG2) are predeterminable for the at least two different parts of the exchanged data frames.

The CAN systems can migrate gradually to CAN FD systems. All nodes in the network must have a CAN FD protocol controller for CAN FD communication, but all CAN FD protocol controllers are also able to take part in standard CAN communication. If the CAN FD communication is limited to data fields with a length of up to eight data bytes, it is not necessary to change the application program apart from the initial configuration of the controller.

The Controller Area Network (CAN) is a serial communications protocol which efficiently supports distributed real-time control with a very high level of security. Its domain of application ranges from high speed networks to low cost multiplex wiring. In automotive electronics, engine control units, sensors, anti-skid-systems, etc. are connected using CAN with bitrates up to 1 Mbit/s. At the same time it is cost effective to build into vehicle body electronics, e.g. lamp clusters, electric windows etc. to replace the wiring harness otherwise required.

The CAN FD (CAN with Flexible Data-Rate) complements CAN in applications that require a higher data-rate. The CAN FD protocol controllers are also able to take part in standard CAN communication, making it possible to use CAN FD only in specific operation modes, e.g. software-download at end-of-line or maintenance. CAN FD requires two sets of bit timing configuration registers, one bit time for the arbitration phase and one bit time for the data field. The bit time for the arbitration phase has the same limitations as in standard CAN networks, the bit time for the data field is chosen with regard to the performance of the chosen transceiver and the characteristics of the CAN FD network.

Standard CAN transceivers can be used for CAN FD, dedicated transceivers are optional. CAN FD protocol controllers may provide additional interface signals to switch—in the phase with higher bit-rate—a dedicated CAN FD transceiver into an alternate operating mode.

Dedicated CAN FD transceivers may use an alternate coding system in the phase with higher bit-rate, not restricted to CAN's NRZ coding.

A CAN FD frame consists of the same elements as a CAN frame, the difference is that in a CAN FD frame, the Data Field and the CRC Field may be longer. Message validation requires, as in CAN, a dominant Acknowledge bit from at least one receiver. The CAN FD fault confinement with Error Frames, Error Counters, Error Passive level and Bus-Off level is the same as in CAN, it is based on the same five error types: Bit Error, Stuff Error, CRC Error, Form Error, and Acknowledgement Error.

An example of a CAN FD frame is pictured in FIG. 1.

CAN FD frames have the same structure as CAN frames, the differentiation between CAN frames and CAN FD frames is at the reserved bit immediately before the Data Length Code in the Control Field. In a CAN FD frame, this bit is transmitted recessive.

The first part of a CAN FD frame, until the reserved bit that distinguishes the protocols, is transmitted with the same bit-rate as a CAN frame. The bit-rate is switched after the reserved bit until the CRC Delimiter is reached or until the CAN FD controller sees an error condition that results in the starting of an Error Frame. CAN FD Error Frames, as well as ACK Field, End of Frame, and Overload Frames are transmitted with the same bit-rate as a CAN Error Frame.

Figure 2:
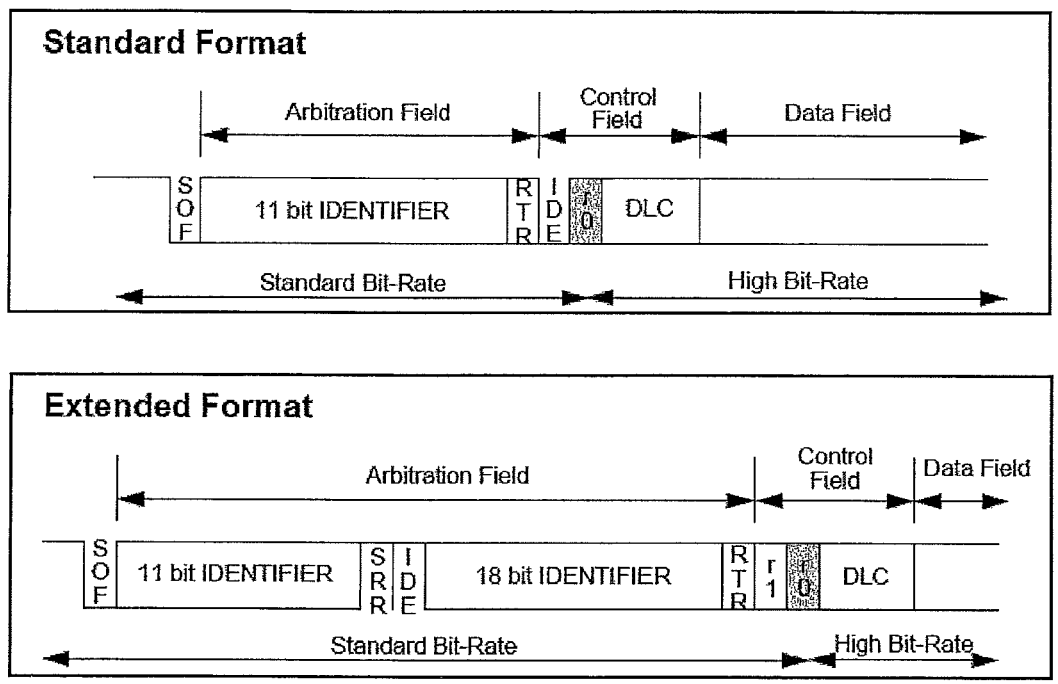
FIG. 2 shows the position where the bit-rate is switched within a message.

Frame Format:

FIG. 2 shows the position where the bit-rate is switched within a message.

CAN FD supports both Identifier lengths of the CAN protocol, the 11 bit long "Standard Format" and the 29 bit long "Extended Format". In both cases, the bit-rate is switched to the shorter bit time at the reserved bit r0 (before the DLC).

The number of bytes in the DATA FIELD is indicated by the DATA LENGTH CODE. This DATA LENGTH CODE is 4 bits wide and is transmitted within the CONTROL FIELD.

The coding of the DATA LENGTH CODE is different in CAN FD. The first nine codes are the same, but the following codes, that in CAN specify a DATA FIELD of eight bytes, specify longer DATA FIELDS in CAN FD. All Remote Frames shall use a DATA LENGTH CODE of zero, regardless of the DATA LENGTH CODE of the corresponding Data Frame.

Note: The maximum length of the DATA FIELD is specified to be 64 bytes. This value, and the other values >8 of DATA LENGTH CODE may change in the final specification of CAN FD.

The coding of the number of data bytes by the DATA LENGTH CODE is described in FIG. 3.

Figure 4:
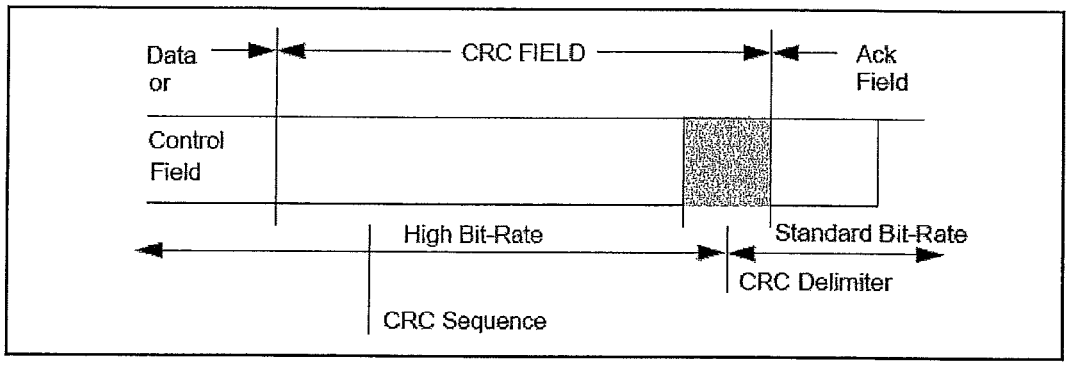
FIG. 4 shows that the CRC FIELD contains the CRC SEQUENCE followed by a CRC DELIMITER.

The CRC FIELD contains the CRC SEQUENCE followed by a CRC DELIMITER, as shown in FIG. 4.

CRC SEQUENCE: The frame check sequence is derived from a cyclic redundancy code (BCH Code).

In order to carry out the CRC calculation the polynomial to be divided is defined as the polynomial, the coefficients of which are given by the relevant bit stream. CAN FD uses different CRC polynomials for different frame length. For frames with up to eight data bytes, the same polynomial as in CAN is used.

For frames with up to eight data bytes, the relevant bit stream is the destuffed bit stream consisting of START OF FRAME, ARBITRATION FIELD, CONTROL FIELD, DATA FIELD (if present) and, for the 15 lowest coefficients, by 0. This polynomial is divided (the coefficients are calculated modulo-2) by the generator-polynomial, which, with a Hamming Distance HD=6, is best suited for frames with bit counts less than 127 bits:

$$X^{15}+X^{14}+X^{10}+X^8+X^7+X^4+X^3+1.$$

For frames with more than eight bytes in the DATA FIELD, different (and longer) CRC polynomials are used, adapted to the length of the frame. The CRC Field is lengthened accordingly. In longer frames, also the stuff bits that occur before the CRC SEQUENCE shall be protected by the CRC.

Each CRC SEQUENCE is calculated in a separate shift register block. At the start of the frame, in all nodes all CRC SEQUENCES shall be calculated concurrently, until after the arbitration one of the CRC SEQUENCES is selected by the reserved bit and by the DLC. Only the selected CRC SEQUENCE can cause a CRC Error.

Note: The actual CRC polynomials will be defined after the coding of the DATA LENGTH CODE is finalized.

CRC DELIMITER: The CRC SEQUENCE is followed by the CRC DELIMITER which consists of one or two 'recessive' bits. A transmitter shall send only one 'recessive' bit as CRC Delimiter but all nodes shall accept two 'recessive' bits before the edge from recessive to dominant that starts the Acknowledge Slot. Note: When the CRC Delimiter is detected, the CAN FD protocol controllers switch back to the bit-rate with the longer bit time.

The phase-shift between the nodes in a CAN network is defined by the delay times in the transceivers and the propagation time on the CAN bus line. The phase-shift is the same in CAN and in CAN FD, but it is proportionally larger in the phase with the shorter bit time. All receivers in the network may have a different phase-shift to the transmitter, since they see the transmitted edges at different times. To compensate for these phase-shifts when the bit-rate is switched back to the longer bit time, one additional bit time tolerance is allowed before and after the edge from recessive to dominant that starts the Acknowledge Slot.

Figure 5:
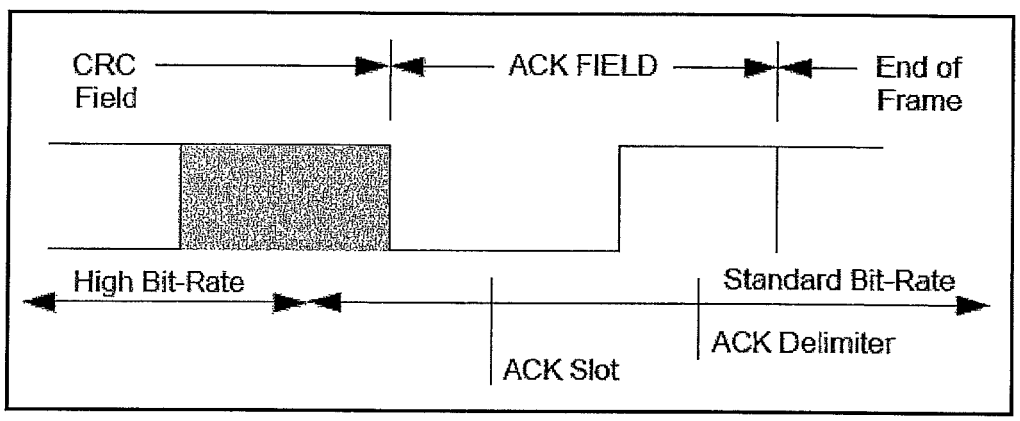
FIG. 5 shows that the ACK FIELD is two or three bits long and contains the ACK SLOT and the ACK DELIMITER.

The ACK FIELD is two or three bits long and contains the ACK SLOT and the ACK DELIMITER, as shown in FIG. 5. In the ACK FIELD the transmitting station sends two 'recessive' bits. A RECEIVER which has received a valid message correctly, reports this to the TRANSMITTER by sending a 'dominant' bit during the ACK SLOT (it sends 'ACK').

ACK SLOT: All stations having received the matching CRC SEQUENCE report this within the ACK SLOT by superscribing the 'recessive' bit of the TRANSMITTER by a 'dominant' bit. To compensate for phase shifts between the receivers, all nodes accept a two bit long 'dominant' phase of overlapping ACK bits as a valid ACK.

ACK DELIMITER: The ACK DELIMITER is the second or third bit of the ACK FIELD and has to be a 'recessive' bit. As a consequence, the ACK SLOT is surrounded by two 'recessive' bits (CRC DELIMITER, ACK DELIMITER).

END OF FRAME: Each DATA FRAME and REMOTE FRAME is delimited by flag sequence consisting of seven 'recessive' bits.

Figure 6:
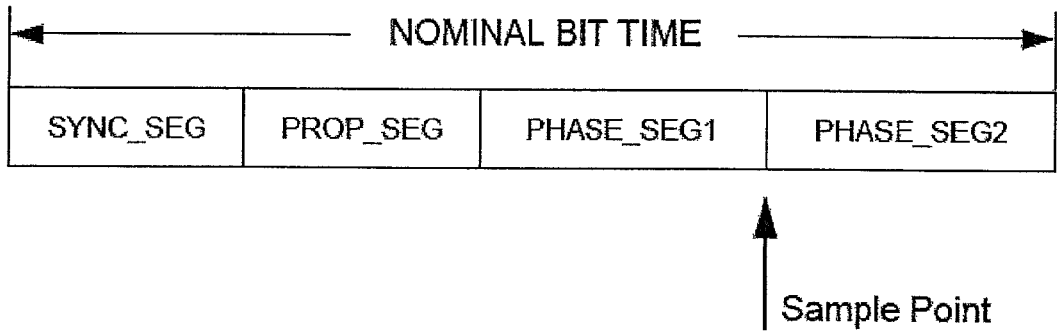
FIG. 6 shows the bit time, where both bit times consist of separate non-overlapping time segments, namely, SYNCHRONIZATION SEGMENT (SYNC_SEG), PROPAGATION TIME SEGMENT (PROP_SEG), PHASE BUFFER SEGMENT1 (PHASE_SEG1), and PHASE BUFFER SEGMENT2 (PHASE_SEG2).

CAN Protocol Features in CAN FD:

The following parts of the CAN protocol specification (Version 2.0, Robert Bosch GmbH, 1991) apply unchanged in the CAN FD protocol:

Definition of TRANSMITTER/RECEIVER
MESSAGE FILTERING
MESSAGE VALIDATION
CODING
ERROR HANDLING
Error Detection
Error Signaling
FAULT CONFINEMENT
Bit Timing Requirements:

The CAN FD protocol defines two bit-rates, the first bit-rate with a longer bit time and the second bit-rate with a shorter bit time. The definition for the first bit-rate is the same as for the NOMINAL BIT RATE and the NOMINAL BIT TIME in the CAN protocol specification. The definition for the second bit-rate requires a separate configuration register set. Both bit times consist of separate non-overlapping time segments, these segments SYNCHRONIZATION SEGMENT (SYNC_SEG)
PROPAGATION TIME SEGMENT (PROP_SEG)
PHASE BUFFER SEGMENT1 (PHASE_SEG1)
PHASE BUFFER SEGMENT2 (PHASE_SEG2)
form the bit time as shown in FIG. 6.

The time segments for the two bit rates of the CAN FD protocol are defined by two sets of configuration registers.

SYNC SEG: This part of the bit time is used to synchronize the various nodes on the bus. An edge is expected to lie within this segment.

PROP SEG: This part of the bit time is used to compensate for the physical delay times within the network. It is twice the sum of the signal's propagation time on the bus line, the input comparator delay, and the output driver delay.

PHASE SEG1, PHASE SEG2: These Phase-Buffer-Segments are used to compensate for edge phase errors. These segments can be lengthened or shortened by resynchronization.

SAMPLE POINT: The SAMPLE POINT is the point of time at which the bus level is read and interpreted as the value of that respective bit. It's location is at the end of PHASE_SEG1.

INFORMATION PROCESSING TIME: The INFORMATION PROCESSING TIME is the time segment starting with the SAMPLE POINT reserved for calculation the subsequent bit level.

The length of the time segments is defined in integer multiples of the TIME QUANTUM, with the TIME QUANTUM is a fixed unit of time derived from the oscillator period. There exists a programmable prescaler, with integral values, ranging at least from 1 to 32. Starting with the MINIMUM TIME QUANTUM, the TIME QUANTUM can have a length of TIME QUANTUM($n$)=$m(n)$*MINIMUM TIME QUANTUM with m the value of the prescaler. Two values for the prescaler, m(1) and m(2) are defined the CAN FD protocol, one for each bit-rate, resulting in two different lengths of the TIME QUANTUM.

Length of Time Segments for the first bit-rate:
SYNC_SEG(1) is 1 TIME QUANTUM(1) long.
PROP SEG(1) is programmable to be 1, 2, . . . , 8 TIME QUANTA(1) long.
PHASE_SEG1(1) is programmable to be 1, 2, . . . , 8 TIME QUANTA(1) long.
PHASE_SEG2(1) is the maximum of PHASE_SEG1(1) and the INFORMATION PROCESSING TIME
The INFORMATION PROCESSING TIME is less than or equal to 2 TIME QUANTA(1) long.

Length of Time Segments for the second bit-rate
SYNC_SEG(2) is 1 TIME QUANTUM(2) long.
PROP_SEG(2) is programmable to be 0, 1, 2, . . . , 8 TIME QUANTA(2) long.
PHASE_SEG1(2) is programmable to be 1, 2, . . . , 8 TIME QUANTA(2) long.
PHASE_SEG2(2) is the maximum of PHASE_SEG1(2) and the INFORMATION PROCESSING TIME
The INFORMATION PROCESSING TIME is less than or equal to 2 TIME QUANTA long.

The total number of TIME QUANTA in a bit time has to be programmable at least from 8 to 25.

The position of the SAMPLE POINT may differ in the two bit timing configurations, the length of the PROP_SEG may be reduced in the configuration for the second bit-rate.

CAN FD Implementation:

CAN FD protocol implementations shall provide the same controller-host interfaces as CAN protocol implementations to provide an easy migration path for existing CAN applications. The minimum required differences are new configuration registers for the CAN FD operation.

The CAN FD protocol allows frames with more than eight data bytes. It is not required that all CAN FD implementations support longer frames, CAN FD implementations may be limited to a subset of DATA FIELD length. A CAN FD implementation that supports only up to e.g. eight data bytes in a frame shall not treat received longer frames as an error, fault-free longer frames shall be acknowledged and shall take part in acceptance filtering. Received data bytes that exceed the CAN FD's data handling capacity shall be discarded. A such limited CAN FD implementation that is requested to transmit a longer frame shall fill up the data bytes in the frame that exceed the data handling capacity with a constant byte pattern. This pattern shall be chosen so that it does not cause the insertion of STUFF BITS, e.g. 0x33.

The following optional interface registers provide an extended analysis of the ongoing communication:

Double set of status registers to distinguish between messages and errors occurring while operating in the first or in the second bit-rate.

Dedicated error counter to compare error rates in the two operating modes.

Per message status flag indicating whether a message was received using the first or the second bit rate.

Per message configuration flag controlling whether a message is to be transmitted using the first or the second bit rate.

Communication management state machine that enables or disables the use of the second bit-rate according criteria like e.g.: Relative error rates in the two bit-rates, reception of message in specific bit-rate, control message received from external bus master, command written by local host.

The invention claimed is:

1. A method for providing serial communication by exchange of data frames between a transmitting node and at least one receiving node, which are connected by a bus system, the method comprising:
assigning the roles of transmitter and receiver to nodes for each of the data frames by an arbitration procedure defined in CAN-Standard ISO 11898-1, wherein the exchanged data frames have a logical structure according to the CAN-Standard ISO 11898-1, wherein the data frames are composed of a sequence of bits, wherein the logical structure of the data frames includes a Start-Of-Frame-Bit, an Arbitration Field, a Control Field, a Data Field, a CRC Field, an Acknowledge Field and an End-Of-Frame Field, wherein the Data Field may have a length of zero bits, wherein each of the Arbitration Field, the Control Field, the CRC Field, the Acknowledge Field and the End-Of-Frame Field contains at least two bits, wherein each bit has a bit time, wherein each bit time is divided into Time Segments, including SYNC_SEG, PROP_SEG, PHASE_SEG1, PHASE_SEG2, wherein bit-rate is defined by reciprocal value of the bit time, wherein for at least one first predeterminable part of the exchanged data frames the bit-rate in that part lies below a maximum value of 1 Mbit/s, wherein for at least one second predeterminable part of the exchanged data frames the bit-rate in that part lies higher than in the at least one first predeterminable part; and
predetermining at least two different sets of values of the Time Segments (SYNC_SEG, PROP_SEG, PHASE_SEG1, PHASE_SEG2) for the at least two different parts of the exchanged data frames.

2. The method of claim 1, wherein in at least one of the at least two different sets of values of the Time Segments, including SYNC_SEG, PROP_SEG, PHASE_SEG1, PHASE_SEG2, a value of PROP_SEG may deviate from the range of values specified in the CAN Standard ISO 11898-1 and in particular may have a value of zero.

3. The method of claim 1, wherein the exchanged data frames with at least two different bit times are distinguishable from data frames with uniform bit times by the reserved bit (r0) contained in the Control Field.

4. The method of claim 1, wherein the at least one second predeterminable part with shorter bit time of an exchanged data frame starts with the reserved bit (r0) and ends with the recessive bit (CRC DELIMITER) at the end of the CRC Field or with the detection of an error condition that results in the starting of an Error Frame.

5. The method of claim 1, wherein exchanged data frames with at least two different bit times may contain a Data Field of a size of more than eight byte, wherein the size of the Data Field is specified by the Data Length Code contained in the Control Field, wherein a different coding for the Data Length Code is used than the one defined in the CAN-Standard ISO 11898-1.

6. The method of claim 5, wherein the different coding for the Data Length Code is such, that the values between 0b0000 and 0b1000 correspond to data fields of zero to eight bytes as in the CAN-Standard ISO 11898-1, and that the values between 0b1001 and 0b1111 correspond to data fields larger than eight bytes.

7. The method of claim 5, wherein the content of the CRC Field for at least the exchanged data frames with a size of the Data Field of more than eight byte is determined using a different CRC polynomial than the one defined in the CAN-Standard ISO 11898-1.

8. The method of claim 5, wherein the size of the CRC Field for at least the exchanged data frames with a size of the Data Field of more than eight byte is different from the one defined in the CAN-Standard ISO 11898-1.

9. The method of claim 5, wherein starting with the Start-Of-Frame-Bit at least two CRC sequences are calculated concurrently, until after the arbitration one of the CRC sequences is selected by the reserved bit (r0) and by the Data Length Code to be the valid CRC sequence which can cause a CRC Error.

10. The method of claim 1, wherein a transmitter sends one recessive bit (CRC DELIMITER) after the CRC sequence and all nodes accept two recessive bits before the change of the bus state that starts the ACK SLOT without detecting an error.

11. The method of claim 1, wherein a receiver which has received the matching CRC sequence sends a dominant bit (ACK) within the ACK SLOT and all nodes accept a two bit long dominant bus state of overlapping ACK bits without detecting an error.

12. The method of claim 1, wherein the at least two different bit times in the exchanged data frames are produced by using two different values of the prescaler, wherein the prescaler is defined as the ratio between TIME QUANTUM and MINIMUM TIME QUANTUM.

13. The method of claim 1, wherein in the at least one second predeterminable part of the exchanged data frames, where the bit time of the bits is shorter than in the at least one first predeterminable part, a different bit coding method is used than in the at least one first predeterminable part.

14. A system for providing serial communication by exchange of data frames between nodes which are connected by a bus system, comprising:
a transmitter node and a receiving node, wherein roles of transmitter and receiver are assigned to nodes for each data frame by an arbitration procedure defined in the CAN-Standard ISO 11898-1, wherein the exchanged data frames have a logical structure according to the CAN-Standard ISO 11898-1, wherein the data frames are composed of a sequence of bits, wherein the logical structure of the data frames includes a Start-Of-Frame-Bit, an Arbitration Field, a Control Field, a Data Field, a CRC Field, an Acknowledge Field and an End-Of-Frame Field, wherein the Data Field may have a length of zero bits, wherein each of the Arbitration Field, the Control Field, the CRC Field, the Acknowledge Field and the End-Of-Frame Field contains at least two bits, wherein each bit has a bit time, wherein each bit time is divided into Time Segments, including SYNC_SEG, PROP_SEG, PHASE_SEG1, PHASE_SEG2, wherein bit-rate is defined by reciprocal value of the bit time, wherein for at least one first predeterminable part of the exchanged data frames the bit-rate in that part lies below a maximum value of 1 Mbit/s, wherein for at least one second predeterminable part of the exchanged data frames the bit-rate in that part lies higher than in the at least one first predeterminable part; and
wherein at least two different sets of values of the Time Segments including SYNC_SEG, PROP_SEG, PHASE_SEG1, and PHASE_SEG2 are predetermined, for the at least two different parts of the exchanged data frames.

* * * * *